March 13, 1962 H. WOLFF 3,025,442
SWITCHING TRANSMITTER POSITIONING OF SYNCHROS
Filed June 18, 1959

INVENTOR.
HERBERT WOLFF
BY

United States Patent Office 3,025,442
Patented Mar. 13, 1962

3,025,442
SWITCHING TRANSMITTER POSITIONING
OF SYNCHROS
Herbert Wolff, Merrick, N.Y., assignor to the United States of America as represented by the United States Atomic Energy Commission
Filed June 18, 1959, Ser. No. 821,341
4 Claims. (Cl. 318—24)

The present invention relates to apparatus for the step or digital positioning of synchros and more particularly to apparatus for positioning synchros by the use of transformer apparatus.

In the ordinary arrangement for positioning a synchro motor, a synchro generator is connected thereto and the rotor of the synchro generator is positioned as desired with the result that the stator coils of the synchro generator develop voltages reflecting the position of the synchro generator rotor. These voltages are transferred to the stator coils of the synchro motor and cause the rotor of the synchro motor to adjust itself in position in accordance with these voltages and thereby in accurate alignment with the position selected in the synchro generator. The voltages developed across the stator coils of the synchro generator are readily calculable from the knowledge of the position of the rotor according to its deviation from an electrical zero, or these voltages may be determined by a measurement thereof over a large number of incremental steps of angular displacement of the synchro generator rotor. By the invention herein disclosed it is possible to select these voltages in a large number of equal angular steps as for example from zero to 99 steps and supply these voltages directly to the stator coils of the synchro motor which will thereby cause the rotor to position itself in the manner explained hereinabove. Thus where the voltages involved are known or calculable it is possible, by this invention, to eliminate the use of a synchro generator altogether and provide electrical switches for selecting in advance the position desired for the rotor of the synchro motor.

It is a first object of this invention to provide apparatus for the digital positioning of a synchro motor.

It is a further object of this invention to provide apparatus for selectively switching a synchro motor into a pre-selected or pre-determined position.

It is still another object of this invention to provide transformer apparatus for selecting voltages which will cause the rotation of a synchro motor into some pre-selected position.

It is still another object of this invention to provide apparatus for eliminating the need for synchro generator apparatus for developing electrical voltages for positioning a synchro motor.

The exact nature of this invention as well as other objects and advantages thereof will be readily apparent from consideration of the following specification relating to the annexed drawing in which.

Figure 1:
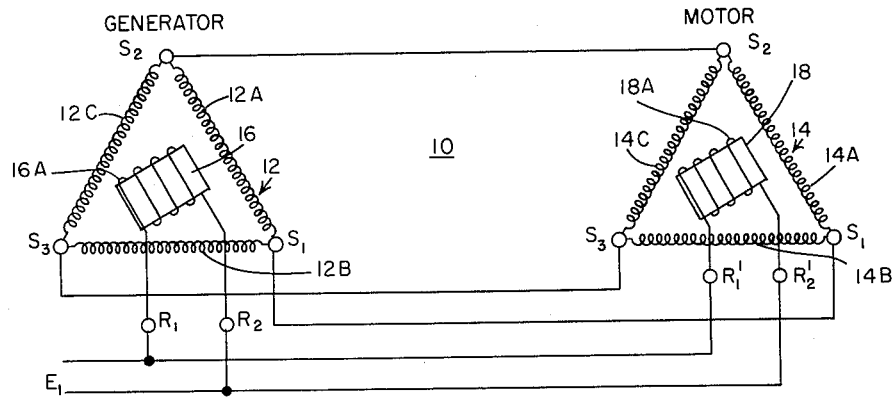
FIGURE 1 is a circuit diagram of a simple conventional synchro system.

Referring to FIGURE 1, there is shown a synchro system 10 comprising a synchro generator 12 and a synchro motor 14 each provided with three phase stator coils 12A, 12B and 12C in the case of synchro generator 12 and stator coils 14A, 14B and 14C in the case of synchro motor 14. The corresponding connecting points of the various stator coils are designated $S_1$, $S_2$ and $S_3$ and are connected by electrical lead lines as illustrated. As is understood in the art, synchro generator 12 is provided with a rotor 16 which is customarily of iron core construction having wound thereon a single coil 16A connected to contacts $R_1$ and $R_2$ to the source of A.C. voltage $E_1$. In a similar fashion, synchro motor 14 is provided with an iron core rotor 18 having a single coil 18A wrapped thereon and connected through its contacts $R_1'$ and $R_2'$ to the same source of voltage $E_1$ in parallel with synchro generator rotor 16. As is understood in the art, rotor 16 of synchro generator 12 is positioned mechanically and the voltages develop across stator coils 12A, 12B and 12C are indicative of the position selected for rotor 16. These voltages are transferred to the similar points on the stator coils of synchro motor 14 and cause rotor 18 of synchro motor 14 to position itself in exact alignment with rotor 16 of synchro generator 12. Thus in the basic synchro system there must be provided a synchro generator to develop the voltages required to position the synchro motor.

Figure 2:
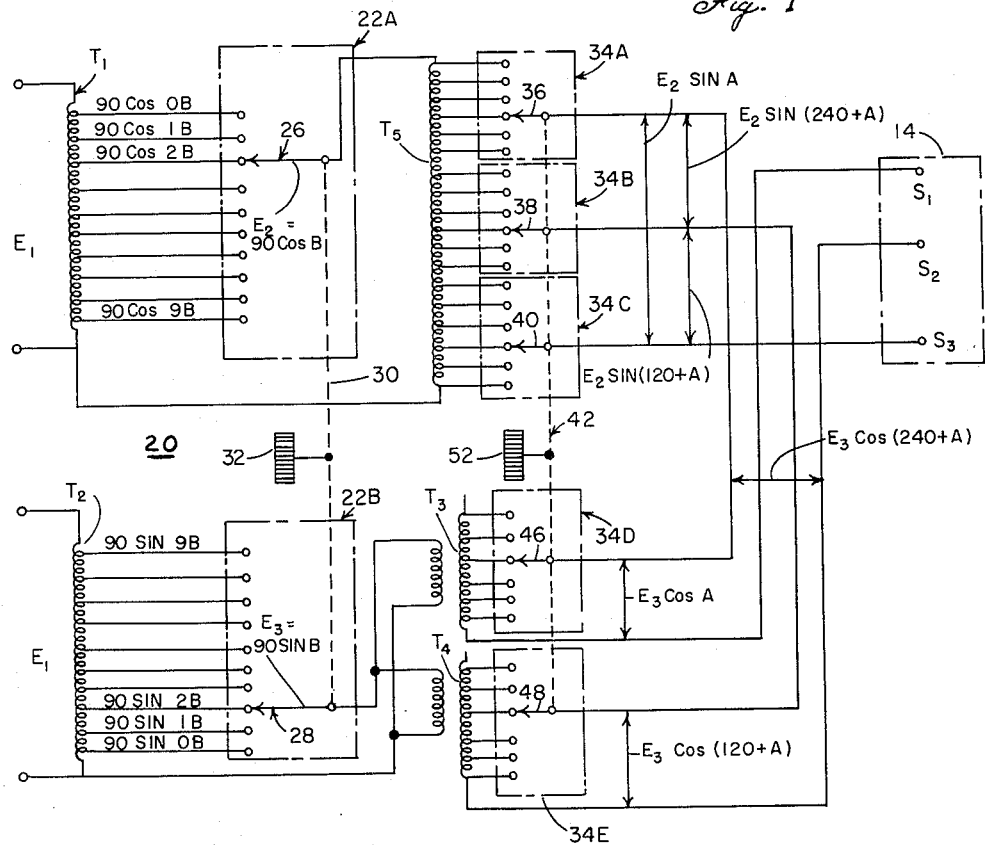
FIGURE 2 is an electrical schematic of apparatus embodying the principles of this invention.

Referring to FIGURE 2 there is shown the apparatus in accordance with this invention for selecting the voltages directly which ordinarily would be produced by synchro generator 12 for positioning synchro motor 14. Apparatus 20 consists of potentiometers or transformers $T_1$ and $T_2$ both connected in parallel across the synchro supply voltage $E_1$. Each of the transformers $T_1$ and $T_2$ in this embodiment is provided with a plurality of ten trigonometry function taps designated in the case of transformer $T_1$, 90 cos 0°, 90 cos B°, and up to 90 cos 9B°. In the case of transformer $T_2$ there are similarly arranged ten taps, but in opposite arrangement than that of $T_1$ and these taps are designated in sines rather than cosines as in understood in the art. Each of the taps of transformer $T_1$ is connected to a point on a switch wafer 22A while each of the taps of transformer $T_2$ is connected to a point on a switch wafer 22B. Corresponding voltage points are selected on switch wafers 22A and 22B by wiper arms 26 and 28 respectively. A knob 32 and a shaft 30 are mechanically connected to wipers 26 and 28, such that rotation of knob 32 moves wipers 26 and 28 in unison. A dial may be provided to tell the operator which position he is selecting. Knob 32, wipers 26 and 28, and wafers 22A and 22B comprise the "units" selector of the system. Voltage $E_2$ appearing on wiper 26 is used to excite a potentiometer or transformer $T_5$, one end of which is connected to the common terminal of transformer $T_1$. Voltage $E_3$ appearing on wiper 28 is used to excite a pair of potentiometers or transformers $T_3$ and $T_4$, one end of each of which is connected to the common terminal of transformer $T_2$. Transformers $T_5$, $T_3$ and $T_4$ are provided with taps of trigonometric functions in a manner similar to that of $T_1$. The taps of transformer $T_5$ are connected to three switch wafers designated 34A, 34B and 34C. The taps of transformer $T_3$ are connected to a switch wafer 34D, and those of transformer $T_4$ are connected to a switch wafer 34E, comprising the "tens" selector of the system. Voltage points are selected on switch wafers 34A through 34E by wipers 36, 38, 40, 46 and 48 respectively.

Wipers 38 and 40 are separated by 120° and 240° from wiper 36, respectively, and wipers 36 and 38 are connected to terminals $S_1$ and $S_2$ of motor 14 through the additive circuits appearing on wipers 46 and 48, respectively; wiper 40 is connected directly to $S_3$ of motor 14, and wipers 36, 38, 40, 46 and 48 are mechanically connected through a shaft 42 which is positioned by a knob 52. Wipers 46 and 48 select their cosine functions for angles A and (120°+A) on transformers $T_3$ and $T_4$, respectively, and the voltage across the two wipers would be the function for (240°+A). Therefore, wiper 36 produces a voltage signal as a function of the product of cos B and sin A and wiper 46 produces a signal of the nature of sin B cos A.

For understanding the operation of the apparatus of

FIGURE 2 reference is again made to FIGURE 1 wherein a voltage of $E_1$ is applied to rotor 16 of synchro generator 12. The output voltages across the secondary or stator coils of generator 12 can be represented by (1)         $ES13 = kE_1 \sin a$
(2)         $ES32 = kE_1 \sin (120+a)$
(3)         $ES21 = kE_1 \sin (240+a)$ where $a$ is the counter-clockwise angular displacement from an electrical zero and $k$ is the transformation ratio of voltage from the primary to the secondary of the synchro generator as is understood in the art.

In working out a digital system for placing these same voltages directly on the identical contacts of synchro motor 14 it can be considered that angle $a$ is made up of the sum of two angles $A+B$, where A equals a tens component of the angle and B is the units component of the angle $a$.

Therefore, by the rules of trigonometric transformation, the voltages applied to the synchro motor stator for positioning to any angle $a$ would be as follows:

(4)   $ES13 = kE \sin (A+B)$
               $= kE \sin A \cos B + kE \cos A \sin B$
(5)   $ES32 = kE \sin (120+A+B)$
               $= kE \sin (120+A) \cos B + kE \cos (120+A) \sin B$
(6)   $ES21 = kE \sin (240+A+B)$
               $= kE \sin (240+A) \cos B + kE \cos (240+A) \sin B$ The arrangement in FIGURE 2 as indicated by the voltages placed on the figure accomplish the multiplication and addition set forth in Formulas 4, 5 and 6. As a result thereof, rotor 18 of synchro motor 14 will be positioned in accordance with the selection made by knobs 32 and 52.

It is thus seen that there has been provided a novel and convenient way of positioning a synchro motor by the selection of voltages directly and without the necessity of introducing a synchro generator for accomplishing this result. The arrangement as described is much more convenient than the use of a complete synchro system for accomplishing this purpose. In addition, it is seen that since the voltage values are calculated it is possible to approach the theoretical positioning of the synchro motor with accuracy heretofore not possible. Almost any degree of accuracy can be pre-selected by increasing or decreasing the number of steps which are selected in the transformer apparatus disclosed. Of course, it is understood that a greater number or smaller number of steps may be selected depending on circumstances and that the units and tens may, under proper circumstances utilize a different number of steps altogether thereby making this apparatus suitable for particular circumstances and operating conditions. Since the apparatus provides the positive selection of the voltages and thereby the positions of the synchro motor the only feed back required to insure the proper positioning of the synchro motor would be the usual voltmeter to indicate that the apparatus is functioning correctly. Once the apparatus is set up there is no way for deviation to occur and it is only necessary to check these values at the installation of the apparatus and no further monitoring ordinarily would be necessary. Since there is avoided a complete synchro system this eliminates the need for an involved maintenance or servicing arrangement and thereby results in greater economies of operation in the long run.

Obviously, many modifications and variations of the present invention are possible in the light of the above teachings. It is therefore to be understood that within the scope of the appended claims the invention may be patented otherwise than as specifically described.

What is claimed is:

1. Transformer apparatus for the positioning of a synchro motor at a preselected shaft angle made up of the sum of first and second components thereof, comprising, first and second divider means for selecting simultaneously a cosine and sine voltage, respectively, of the first component of said angle, third divider means for selecting from said cosine voltage the first, second and third products of said cosine voltage and the sine voltages of the second component, the second component plus 120°, and the second component plus 240°, respectively, fourth and fifth divider means for selecting from said sine voltage the fourth and fifth products of said sine voltage and the cosine voltages of the second component and the second component plus 120°, respectively, means for adding the first product to the fourth product and delivering the sum thereof to said synchro motor, means for adding the second product to the fifth product and delivering the sum thereof to said synchro motor, and means for delivering the third product to said synchro motor for positioning the rotor shaft thereof at said preselected angle.

2. Transformer apparatus for the digital positioning of a synchro motor at a preselected shaft angle made up of the sum of first and second components thereof, comprising, first and second stepped divider means for selecting simultaneously a cosine and sine voltage, respectively, of the first component of said angle, third stepped divider means for selecting from said cosine voltage the first, second and third products of said cosine voltage and the sine voltages of the second component, the second component plus 120°, and the second component plus 240°, respectively, fourth and fifth stepped divider means for selecting from said sine voltage the fourth and fifth products of said sine voltage and the cosine voltages of the second component and the second component plus 120°, respectively, means for adding the first product to the fourth product and delivering the sum thereof to said synchro motor, means for adding the second product to the fifth product and delivering the sum thereof to said synchro motor, and means for delivering the third product to said synchro motor, for positioning the rotor shaft thereof at said preselected angle.

3. Transformer apparatus for the digital positioning of a synchro motor at a preselected shaft angle made up of the sum of first and second component thereof, comprising, first and second divider means including step operating wipers for selecting simultaneously a cosine and sine voltage, respectively, of the first component of said angle, third divider means including step operating wipers for selecting from said cosine voltage the first, second and third products of said cosine voltage and the sine voltages of the second component, the second component plus 120°, and the second component plus 240°, respectively, fourth and fifth divider means including step operating wipers for selecting from said sine voltage the fourth and fifth products of said sine voltage and the cosine voltages of the second component and the second component plus 120°, respectively, means for adding the first product to the fourth product and delivering the sum thereof to said synchro motor, means for adding the second product to the fifth product and delivering the sum thereof to said synchro motor, means for delivering the third product to said synchro motor, for positioning the rotor shaft thereof at said preselected angle, means for synchronizing the wiper movement in the first and second divider means, and means for synchronizing the wiper movement in the remaining divider means to permit said apparatus to function with simple separate adjustments of the first and second components of said angle on all of said divider means.

4. Transformer apparatus for the positioning of a synchro motor at a preselected shaft angle made up of the sum of first and second components thereof, comprising, first and second voltage divider means for selecting simultaneously from a constant voltage source a cosine and sine voltage, respectively, of the first component of said angle, third voltage divider means for selecting from said cosine voltage the first, second and third products of said cosine voltage and the sine voltages of the second component, the second component plus 120°, and the second component plus 240°, respectively, fourth and fifth voltage divider means in parallel for selecting from said sine voltage the fourth and fifth products of said sine voltage and the cosine voltages of the second component and the second component plus 120°, respectively, means for adding the first product to the fourth product and delivering the sum thereof to said synchro motor, means for adding the second product to the fifth product and delivering the sum thereof to said synchro motor, means delivering the third product to said synchro motor, for positioning the rotor shaft thereof at said preselected angle, each of said divider means provided with wipers for selecting the desired voltage signals, and means for adjusting all the first component angle wipers in synchronism and all the second component angle wipers in synchronism.

References Cited in the file of this patent

UNITED STATES PATENTS

| | | |
|---|---|---|
| 2,783,422 | Fouassin | Feb. 26, 1957 |
| 2,808,547 | Adler et al. | Oct. 1, 1957 |
| 2,817,078 | Pfeifer | Dec. 17, 1957 |
| 2,853,699 | O'Neil | Sept. 23, 1958 |